June 9, 1953  J. N. GAROFALO  2,641,359
AUTOMOBILE ACCESSORY
Filed Aug. 3, 1951
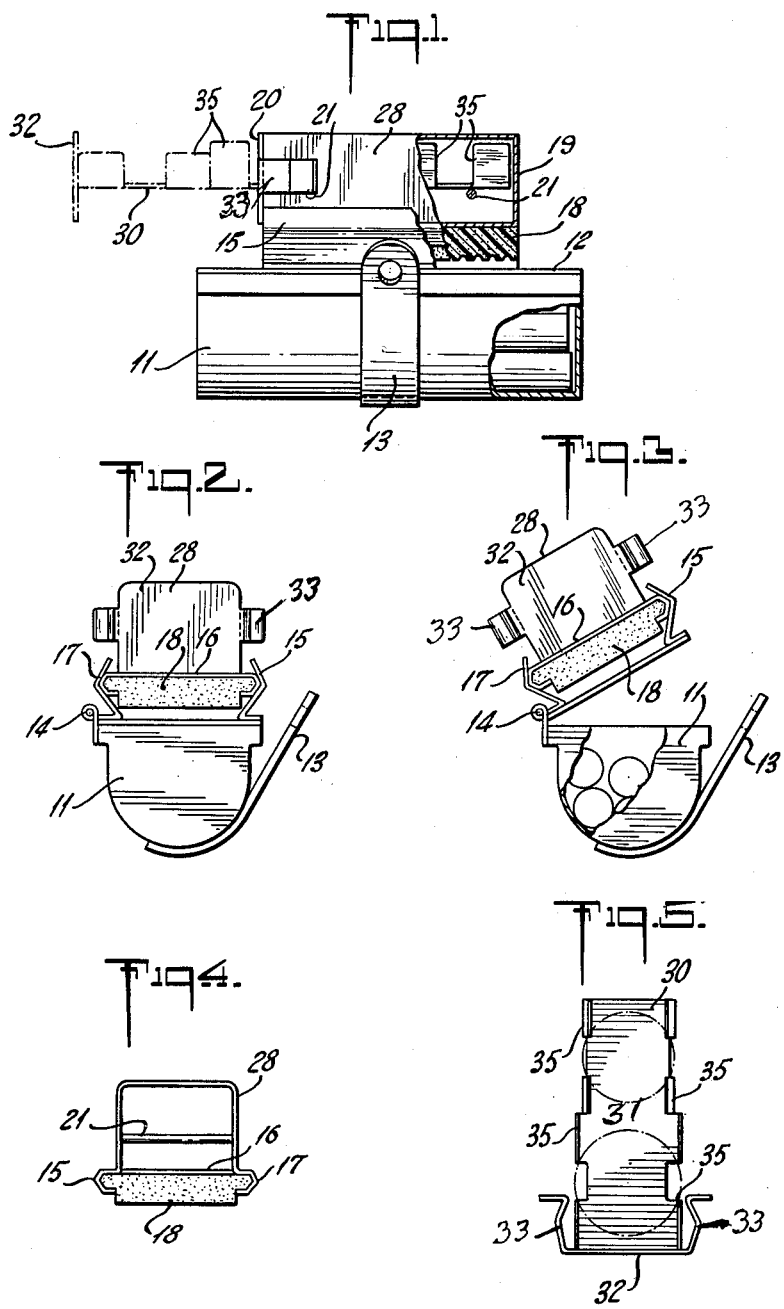
INVENTOR.
JOSEPH N. GAROFALO
ATTORNEY Patented June 9, 1953

2,641,359

UNITED STATES PATENT OFFICE 2,641,359

AUTOMOBILE ACCESSORY

Joseph N. Garofalo, Plainfield, N. J.

Application August 3, 1951, Serial No. 240,247

2 Claims. (Cl. 206—19.5)

This invention relates to automobile accessories, more particularly to devices which may be attached to the dash of the automobile to provide for the convenience of the driver.

One of the objects of this invention is to provide a window cleaning appliance that is readily accessible for use of the driver of the automobile and is manually removable from its supporting member for use.

The handle of the wiper or cleaner is provided with means for holding coins found necessary for use in parking meters now universally installed on streets in the crowded areas of cities and towns.

Another object is to provide a novel construction and combination of parts hereinafter fully described and claimed.

The foregoing and other features of my invention will now be described in connection with the accompanying drawing forming part of this specification in which I have illustrated my device in its preferred form after which I shall point out in the claims those features which I believe to be new and of my own invention.

In the drawings:

Figure 1 is a longitudinal view of my automobile accessory with the drawer part way extended shown in dotted lines.

Figure 2 is an end view thereof looking at the end to left in Figure 1.

Figure 3 is a view same as that shown in Figure 2 with the cover of the cigarette container in open position.

Figure 4 is an end view of the wiper showing the cross guides and supports for coin drawer.

Figure 5 is a plan view of the coin drawer.

In the carrying out of my invention I provide a receptacle 11 with cover 12 of convenient size to hold cigarettes. Attached to the side of the receptacle I provide a fastening arm 13 for attaching to the dash or other convenient place in an automobile. On the side of the receptacle 11 opposite the fastening means 13 I provide a hinge 14 for the cover 12. On the upper side of the cover 12 I provide two longitudinally spring guiding edges 15 adapted to receive the base 16 by the slides 17 of the wiper 18 to firmly hold it in place.

The wiper 18 is preferably formed of a rubber-like material held between the slides 17. Above the base 16 I provide a hollow handle 28 closed at one end 19 and opened at the other end 20.

Referring to Figure 4 which is a view looking into the open end of the handle 28 will be observed that I provide cross guide 21 upon which the bottom 30 of the drawer 31 rests. The drawer 31 is provided with an enlarged end 32 which is sized to close the opening 20 of the handle 28. On the drawer end 32 I provide two spring arms 33 adapted to embrace the outer edges of the handle portion 28 and hold the drawer in place.

The tray of the drawer 31 is provided with spring retaining clips 35 to hold coins used in parking meters.

I prefer to construct my accessory from plastic material but it may be made of sheet metal as may be desirable or convenient.

I wish it distinctly understood that my automobile accessory herein illustrated and described is in the form in which I desire to construct it and that any changes or modifications may be made as may be convenient or desirable without departing from the salient features of my invention and I therefore intend the following claims to cover such modifications as naturally fall with in the lines of invention.

I claim:

1. An automobile accessory in combination, a base comprising a box-like body provided with a fastening means extending away from the body on one longitudinal side, a cover for the box hinged to the side opposite the before mentioned side to which the fastening means is formed, a removable windshield wiper provided with a hollow handle portion and a pad of rubber-like plastic held between two V-shaped members formed along the longitudinal sides of handle portion, said V-shaped member slidably engaged by co-operating V-shaped portions mounted on the hinged cover of the box-like member for securing the parts together, the hollow handle, closed on one end and opened on the other, is provided with guides within the hollow of the handle to accommodate a removable sliding drawer, a drawer provided with spring clips adapted to receive and hold coins, an end on the drawer adapted to close the open end of the handle portion of the wiper, said end provided with spring clips adapted to embrace the sides of the wiper handle to securely hold the drawer in place.

2. An automobile accessory comprising in combination, a box-like compartment for holding cigarettes or the like, a bracket portion attached to one longitudinal side of the compartment, a cover hinged to the side of the compartment away from the side of the bracket and having two longitudinal V-shaped guides, a wind shield wiper comprising a body portion having two V-shaped portions co-operating with a wiper pad, and the V-shaped portions on the cover for securing the parts together.

JOSEPH N. GAROFALO.

References Cited in the file of this patent

UNITED STATES PATENTS

| Number | Name | Date |
|---|---|---|
| Re. 16,993 | Stechbart | June 12, 1928 |
| 1,071,363 | Smith | Aug. 26, 1913 |